(12) United States Patent
Sen et al.

(10) Patent No.: US 11,323,423 B2
(45) Date of Patent: May 3, 2022

(54) METHOD AND APPARATUS FOR INFERRING ABR VIDEO STREAMING BEHAVIOR FROM ENCRYPTED TRAFFIC

(71) Applicants: AT&T Intellectual Property I, L.P., Atlanta, GA (US); The Regents of the University of Michigan, Ann Arbor, MI (US)

(72) Inventors: Subhabrata Sen, Westfield, NJ (US); Shichang Xu, Ann Arbor, MI (US); Zhuoqing Morley Mao, Ann Arbor, MI (US)

(73) Assignees: AT&T Intellectual Property I, L.P., Atlanta, GA (US); The Regents of the University of Michigan, Ann Arbor, MI (US)

( * ) Notice: Subject to any disclaimer, the term of this patent is extended or adjusted under 35 U.S.C. 154(b) by 511 days.

(21) Appl. No.: 16/191,116

(22) Filed: Nov. 14, 2018

(65) Prior Publication Data

US 2020/0153805 A1    May 14, 2020

(51) Int. Cl.
| | |
|---|---|
| *H04L 29/06* | (2006.01) |
| *H04L 12/26* | (2006.01) |
| *H04L 12/24* | (2006.01) |
| *H04L 12/733* | (2013.01) |
| *H04L 43/04* | (2022.01) |
| *H04L 41/12* | (2022.01) |
| *H04L 45/122* | (2022.01) |
| *H04L 65/80* | (2022.01) |

(52) U.S. Cl.
CPC .......... *H04L 63/0457* (2013.01); *H04L 41/12* (2013.01); *H04L 43/04* (2013.01); *H04L 45/122* (2013.01); *H04L 65/80* (2013.01)

(58) Field of Classification Search
CPC ..... H04L 63/0457; H04L 41/12; H04L 43/04; H04L 45/122; H04L 65/80
See application file for complete search history.

(56) References Cited

U.S. PATENT DOCUMENTS

| | | |
|---|---|---|
| 9,241,186 B2 | 1/2016 | Kummer |
| 9,247,291 B2 | 1/2016 | Kummer |
| 9,756,106 B2 | 9/2017 | Parthasarathy |
| 9,979,992 B2 | 5/2018 | Kummer |
| 10,063,922 B2 | 8/2018 | Bar Yanai et al. |

(Continued)

*Primary Examiner* — Natasha W Cosme
(74) *Attorney, Agent, or Firm* — Guntin & Gust, PLC; Jay Anderson

(57) ABSTRACT

Aspects of the subject disclosure may include, for example, a method in which a processing system parses a network trace to collect packet information for an encrypted adaptive bite rate (ABR) video stream encoded into a plurality of tracks; detects request packets corresponding to a sequence of requests for video segments to be downloaded at a network client; and determines a traffic volume downloaded at the network client to obtain a sequence of traffic volumes. The processing system identifies, for each of the sequence of traffic volumes, a set of candidate segments each having a size meeting a size-matching criterion; selects a segment from the set of candidate segments to determine a segment sequence meeting an index-matching criterion; and infers characteristics of the sequence of traffic volumes based on the segment sequence. Other embodiments are disclosed.

20 Claims, 15 Drawing Sheets

(56) References Cited

U.S. PATENT DOCUMENTS

| | | |
|---|---|---|
| 10,070,156 B2 | 9/2018 | Horev et al. |
| 2002/0010797 A1* | 1/2002 | Moulton ................. H04L 69/04 709/247 |
| 2016/0080238 A1* | 3/2016 | Bar-Yanai ........... H04L 43/0894 709/224 |
| 2017/0070781 A1* | 3/2017 | Bar Yanai ........ H04N 21/44008 |
| 2017/0237777 A1 | 8/2017 | Joch et al. |
| 2017/0366597 A1 | 12/2017 | Parthasarathy |

* cited by examiner

2031

2032

2041

2042

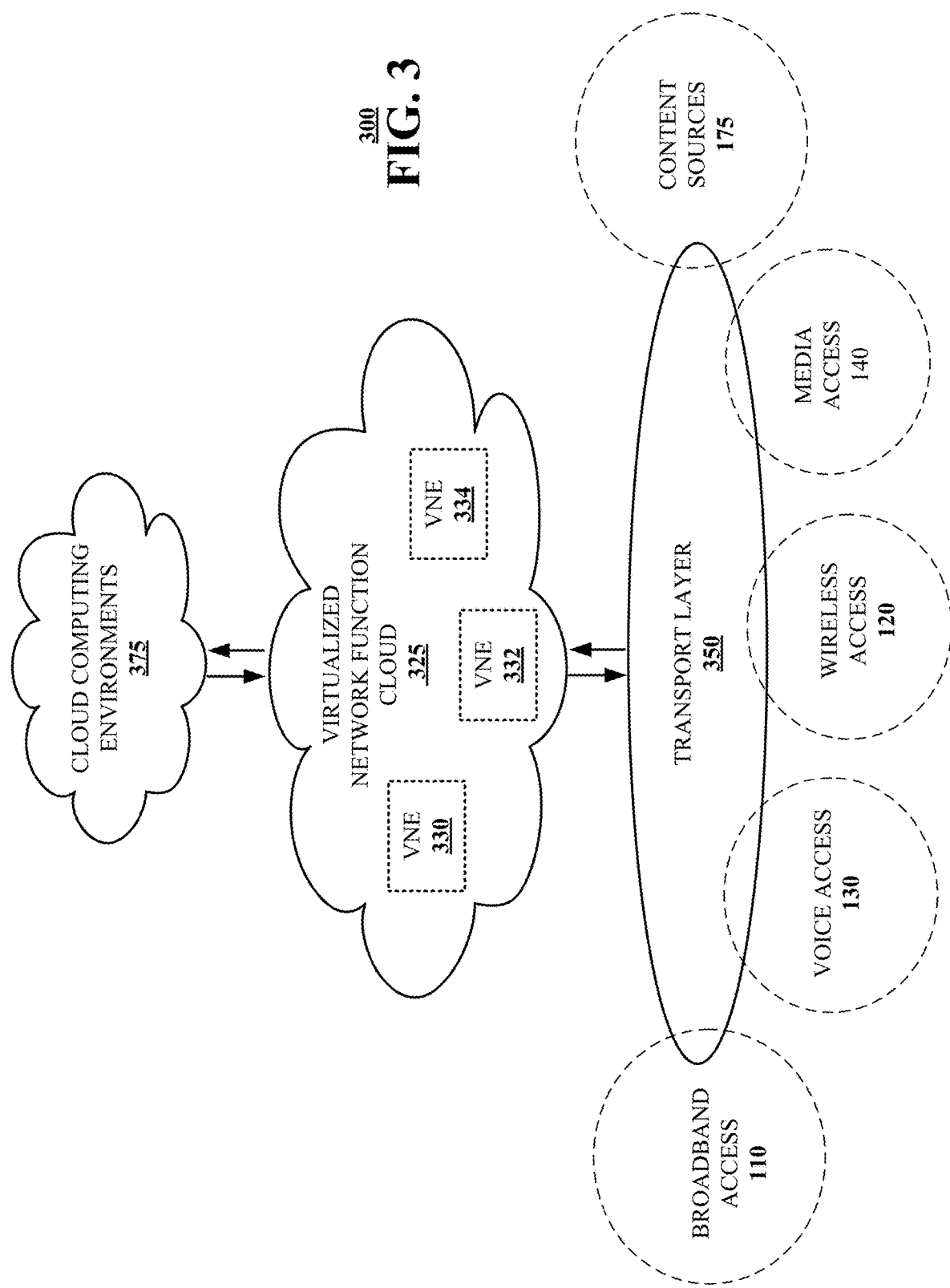

METHOD AND APPARATUS FOR INFERRING ABR VIDEO STREAMING BEHAVIOR FROM ENCRYPTED TRAFFIC

FIELD OF THE DISCLOSURE

The subject disclosure relates to a method and system for inferring adaptive bit rate (ABR) video streaming behavior when the streaming video traffic is encrypted.

BACKGROUND

Over-the-top (OTT) video-on-demand (VoD) video streaming is increasingly popular and accounts for a significant portion of Internet traffic. To deliver a satisfying quality of experience (QoE) to viewers over time-varying network conditions, video streaming providers can use adaptive bit rate (ABR) streaming.

Network operators and application service providers often seek to understand the behavior of client systems (also referred to herein as players) for purposes such as performance diagnosis and optimization. However, the adoption of end-to-end encryption protocols by streaming providers, e.g. secure hypertext transfer protocol (HTTPS) and Quick User Datagram Protocol (UDP) Internet Connections (QUIC), imposes limits on available information regarding the ABR network traffic.

BRIEF DESCRIPTION OF THE DRAWINGS

Reference will now be made to the accompanying drawings, which are not necessarily drawn to scale, and wherein:

FIG. 2A-1 schematically illustrates ABR video streaming from a server to a client system functioning within the communication network of FIG. 1 in accordance with various aspects described herein.

FIG. 2A-2 schematically illustrates video content encoded into tracks and segments for delivery to a client system via the communication network of FIG. 1.

FIGS. 2B-1 and 2B-2 illustrate downlink traffic over a QUIC connection, including video and audio segments.

FIG. 2C-1 illustrates video segment sizes across different tracks of a video program.

FIG. 2C-2 illustrates likelihood of uniqueness of segment sequences of various lengths.

FIG. 2D-1 illustrates size variability of video segments in the same track.

FIG. 2D-2 illustrates uniqueness of a video for a given sequence length.

FIG. 2E-1 is a flowchart illustrating a method for using a segment sequence inferencer (S2I), in accordance with embodiments of the disclosure.

FIG. 2E-2 is a flowchart illustrating a method for inferring information regarding a video program using a segment sequence inferencer (S2I), in accordance with embodiments of the disclosure.

FIGS. 2G-1 and 2G-2 schematically illustrate graphs used to solve a shortest-path problem in S2I inferencing, in accordance with embodiments of the disclosure.

FIG. 3 is a block diagram illustrating an example, non-limiting embodiment of a virtualized communication network in accordance with various aspects described herein.

DETAILED DESCRIPTION

Figure 1:
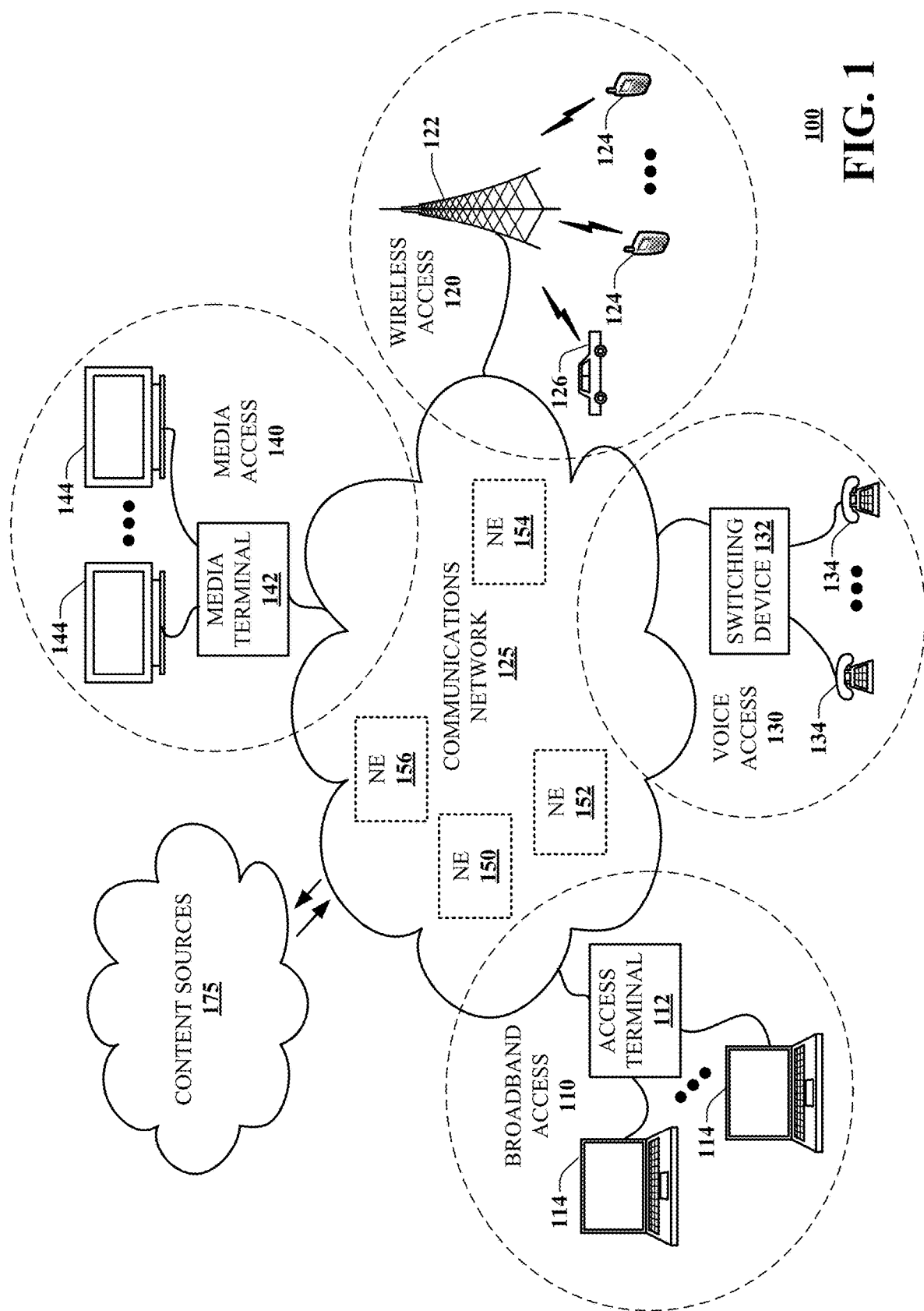
FIG. 1 is a block diagram illustrating an exemplary, non-limiting embodiment of a communications network in accordance with various aspects described herein.

The subject disclosure describes, among other things, illustrative embodiments for analysis of ABR streaming over HTTPS/QUIC encrypted connections. According to embodiments of the disclosure, the identity of each downloaded segment is inferred, based on limited information in the encrypted traffic. Other embodiments are described in the subject disclosure.

One or more aspects of the subject disclosure include a method in which a processing system obtains a network trace comprising data regarding a video stream requested by a network client; the video stream includes an adaptive bit rate (ABR) stream encoded into a plurality of tracks having different bitrates, and the video stream is encrypted according to an encryption protocol. The method also includes parsing the network trace to collect packet information for the video stream, detecting a plurality of request packets corresponding to a sequence of requests by the network client for video segments to be downloaded at the network client, and determining a traffic volume downloaded at the network client between consecutive requests, thereby obtaining a sequence of traffic volumes. The method further includes identifying, from the plurality of tracks for each respective one of the sequence of traffic volumes, a set of candidate segments each having a size meeting a size-matching criterion relative to the respective one of the sequence of traffic volumes; selecting a segment from the set of candidate segments for each respective one of the sequence of traffic volumes, to determine a segment sequence meeting an index-matching criterion relative to the sequence of traffic volumes; and inferring characteristics of the sequence of traffic volumes based on the segment sequence.

One or more aspects of the subject disclosure include a device comprising a processing system and a memory that stores executable instructions that, when executed by the processing system, facilitate performance of operations. The operations comprise obtaining a network trace comprising data regarding an audio/video stream requested by a network client; the audio/video stream comprises an adaptive bit rate (ABR) stream including an audio track and a plurality of video tracks having different bitrates, and the audio/video stream is encrypted. The operations also comprise parsing the network trace to collect packet information for the video stream; detecting a plurality of request packets corresponding to a sequence of requests by the network client for video segments to be downloaded at the network client; and determining a traffic volume downloaded at the network client between consecutive requests to obtain a sequence of traffic volumes. The operations further comprise identifying, from the plurality of tracks for each respective one of the sequence of traffic volumes, a set of candidate segments each having a size meeting a size-matching criterion relative to the respective one of the sequence of traffic volumes; selecting a segment from the set of candidate segments for each respective one of the sequence of traffic volumes, to determine a segment sequence meeting an index-matching criterion relative to the sequence of traffic volumes; and inferring characteristics of the sequence of traffic volumes based on the segment sequence.

One or more aspects of the subject disclosure include a machine-readable medium comprising executable instructions that, when executed by a processing system, facilitate performance of operations. The operations comprise parsing a network trace comprising data regarding a video stream requested by a network client; the video stream comprises an adaptive bit rate (ABR) stream encoded into a plurality of tracks having different bitrates, and the video stream is encrypted according to an encryption protocol. The operations also comprise detecting, based on the parsing, a plurality of request packets corresponding to a sequence of requests by the network client for video segments to be downloaded at the network client; and determining a traffic volume downloaded at the network client between consecutive requests to obtain a sequence of traffic volumes. The operations further comprise identifying, from the plurality of tracks for each respective one of the sequence of traffic volumes, a set of candidate segments each having a size meeting a size-matching criterion relative to the respective one of the sequence of traffic volumes; selecting a segment from the set of candidate segments for each respective one of the sequence of traffic volumes, to determine a segment sequence meeting an index-matching criterion relative to the sequence of traffic volumes; and inferring characteristics of the sequence of traffic volumes based on the segment sequence.

Referring now to FIG. 1, a block diagram is shown illustrating an example, non-limiting embodiment of a communications network 100 in accordance with various aspects described herein. For example, communications network 100 can facilitate in whole or in part obtaining a network trace by a processing system, parsing the network trace, detecting a plurality of request packets corresponding to a sequence of requests by a network client for video segments to be downloaded at the network client, and determining a traffic volume downloaded at the network client between consecutive requests to obtain a sequence of traffic volumes. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Adaptive Bitrate Streaming

Figures 1, 2A:
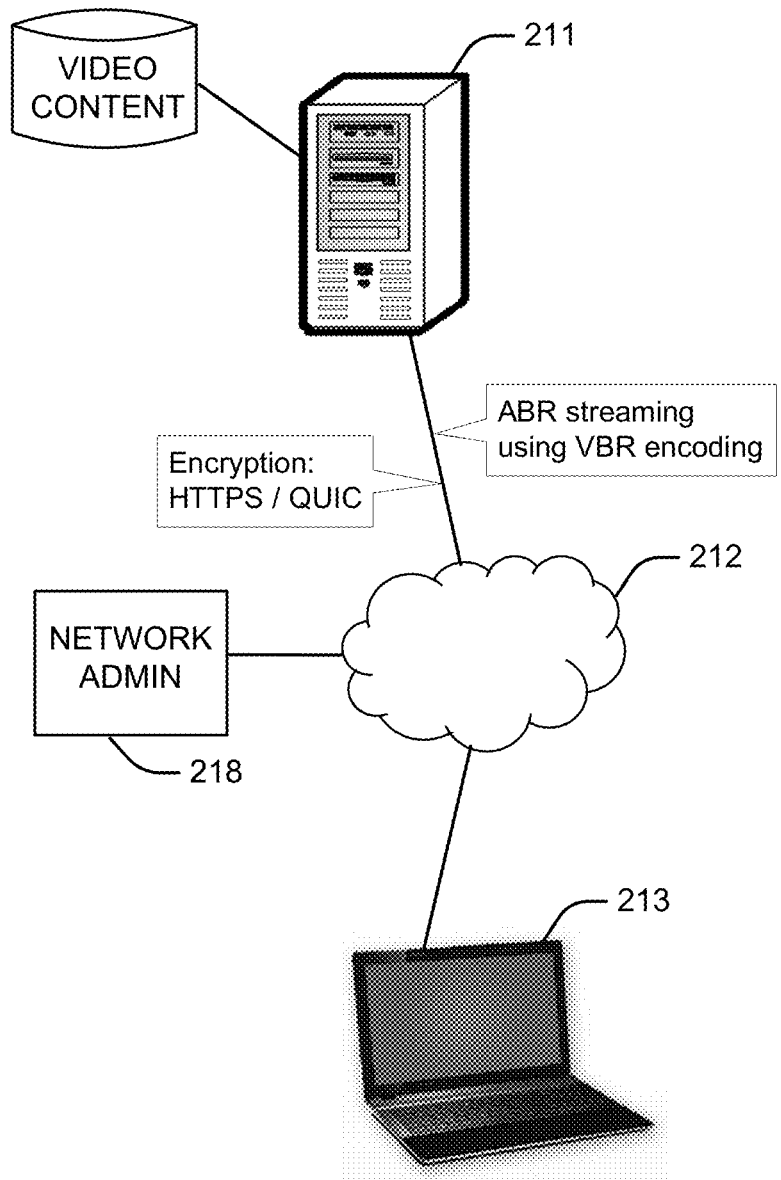

FIG. 2A-1 is a block diagram illustrating an example, non-limiting embodiment 2011 of a system functioning within the communication network of FIG. 1 in accordance with various aspects described herein. A content provider (e.g. Netflix®, YouTube®) uses ABR streaming to deliver video content from a server 211 via network 212 for download at client system 213; the video stream may be encoded using Variable Bitrate Encoding (VBR). If the video stream is also encrypted, a network administrator 218 will have only limited information regarding the download.

Figures 2, 2A:
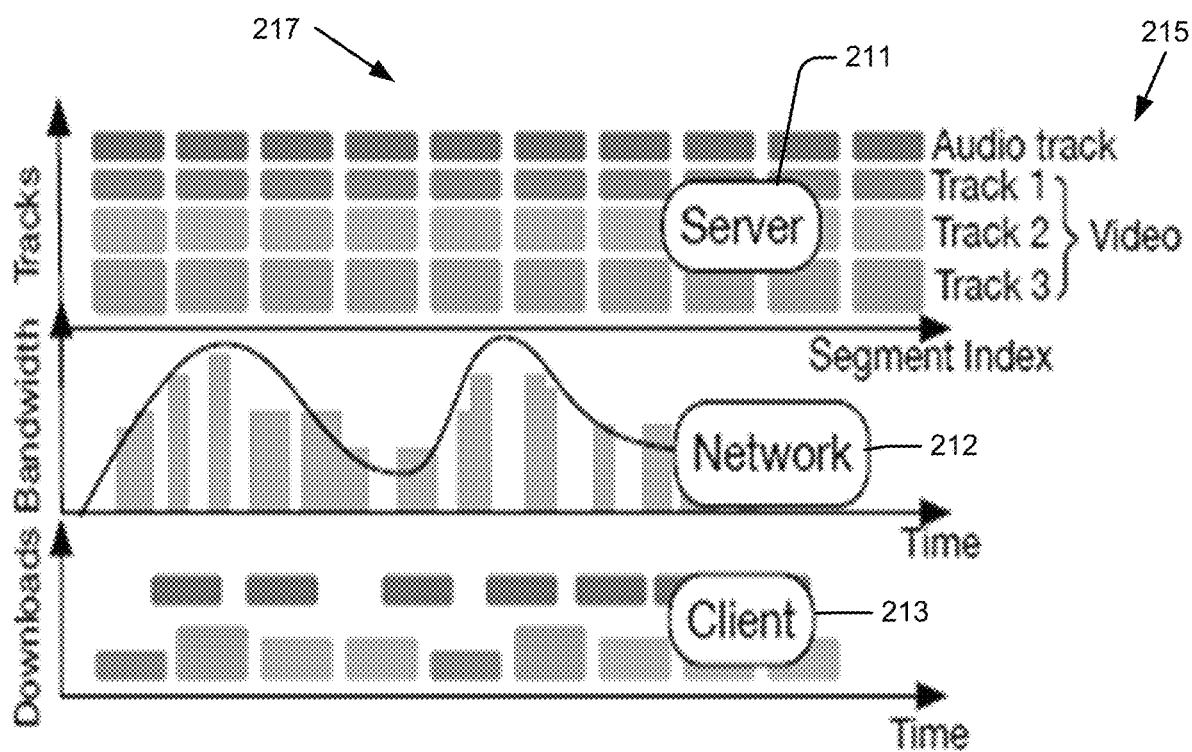

FIG. 2A-2 is a schematic illustration 2012 of server activity, network bandwidth, and client downloads. As shown in FIG. 2A-2, server 211 encodes the video into multiple quality/bitrate levels called tracks 215, and splits each track into shorter segments 217, each containing a few seconds' playback worth of video data. The player then dynamically determines which track (from this "ladder" of tracks) to download next, on a per-segment basis in reaction to changing network conditions.

At the beginning of playback, the client downloads the manifest from the server to get information on the tracks and segments. Then it uses HTTP to download segments in order of increasing playback indexes. The client typically maintains a buffer to absorb network variance and downloads segments ahead of the playback time. During streaming, it applies custom complex adaptation logic to switch the streaming video quality by downloading segments from different tracks based on factors including measured network bandwidth and client buffer occupancy etc. For example, when the buffer occupancy is high, it can select high-quality tracks more aggressively without risking stalls. Some players also use segment replacement (SR) under certain conditions, e.g., if network bandwidth improves. They essentially discard already downloaded low-quality segments (discarded segments) in the client buffer that have not yet been played, and download and play the corresponding segments from potentially higher quality tracks (replacement segments), to improve user perceived video quality at the cost of additional data usage.

To both characterize the streaming QoE (common metrics include the average streaming bitrate, startup delay, and stalls), and understand the underlying causes for the observed QoE, it is critical to analyze the network traffic and identify the segments downloaded across time. For example, knowing the indexes of downloaded segments across time and the track they come from, we can measure the displayed track distribution and furthermore emulate the buffer occupancy. In addition, associating the tracks of downloaded segments with the network condition and client buffer occupancy at the time when they were downloaded can yield insights on why players deliver certain QoE, and drive design improvements.

As used herein, a segment corresponding to the $i^{th}$ request is denoted $C_i$ and its media type (audio or video), track, index and size as $M_i$, $T_i$, $I_i$ and $S_i$ respectively. In the case of audio content, streaming services generally use Constant Bitrate encoding (CBR), resulting in constant audio segment size; accordingly all audio segments are assumed herein to have a constant size $S_a$.

In accordance with embodiments of the disclosure, the segment identities ($M_i$, $T_i$, $I_i$) are inferred from information still available in the encrypted traffic such as traffic volume. As used herein, the generated network traffic volume corresponding to download $C_i$ is denoted $V_i$; $V_i$ can be calculated for different encryption protocols (e.g. HTTPS, QUIC) as explained below. As used herein, l(i) denotes the request index of the last downloaded segment (before request i) with the same media type as $C_i$. The following property holds during streaming, which can be used to perform the segment inference:

$I_i \leq I_{l(i)}$ if the client starts SR at request $I$     (Property 1)

$I_i = I_{l(i)} + 1$ otherwise

Commercial VOD services are increasingly adopting VBR encoding for the video tracks. The encoder allocates a higher bitrate to encode the segments corresponding to complex scenes and lower bitrates to encode segments corresponding to simpler scenes. Compared with CBR, VBR shows higher efficiency and offers comparable video quality with a lower average bitrate than CBR.

However, VBR introduces greater variance in sizes across segments in the same track. In addition, size ranges of segments from different tracks can overlap, making it difficult to infer the downloaded track directly using a segment's size information gleaned from network traffic.

Traffic Encryption

End-to-end encrypted transport protocols are being increasingly used for security and privacy considerations. Two popular protocols are HTTP over TLS (HTTPS) and QUIC; in particular, HTTPS is a widely used encryption protocol. Video providers such as Netflix use HTTPS to encrypt the video traffic. QUIC is a new UDP-based encrypted transport protocol from Google that shows better performance compared to TCP, and elicited strong interest in the field, leading to IETF standardization efforts and increasing adoption by industry including YouTube and Snapchat®.

HTTPS and QUIC share many properties. Both use Transport Layer Security (TLS) encryption. Only very limited information can be obtained by passive in-network third-party monitoring. The server domain name can be known from the Server Name Indication (SNI) extension sent by the client during the handshake phase before the secure connection is fully established. Once the handshake is done, all the packet payloads are encrypted using TLS. An in-network third party can only get the TCP/QUIC/IP headers and packet timing and size information. None of the application layer data, e.g., HTTP request URL, response content and request/response headers, can be observed.

Figures 2, 2B:
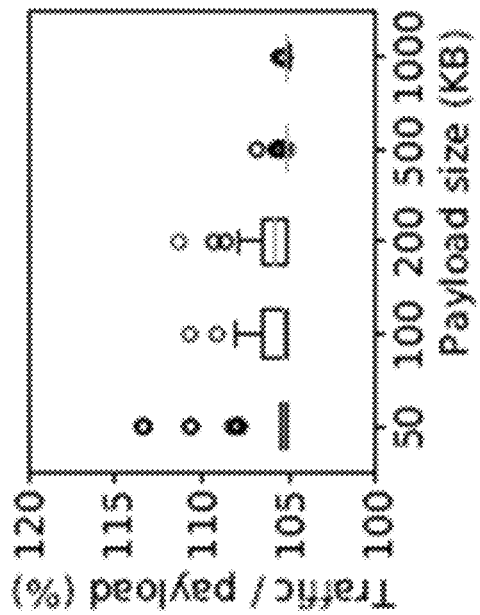
Figures 1, 2B:
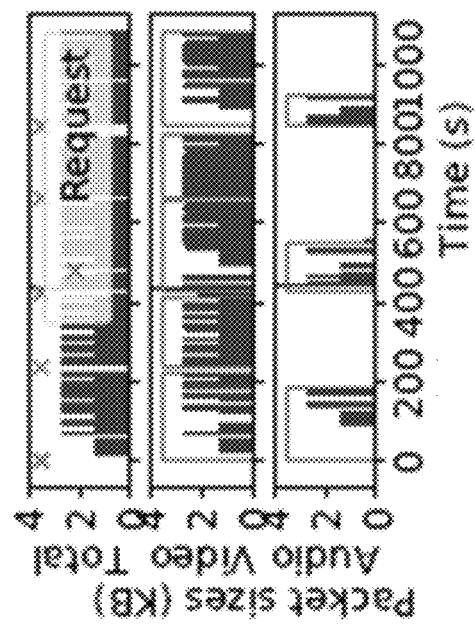

QUIC has some unique properties different from HTTPS which make its analysis more challenging. A retransmitted HTTPS packet can be detected from the SEQ number in the underlying TCP header. However, QUIC uses UDP as the transport layer protocol and each QUIC packet carries a new packet number in the header, including those carrying retransmitted data. This makes it difficult to distinguish retransmitted QUIC packets from the network data. Therefore, for QUIC, in our scheme, the traffic volume $V_i$ calculation unavoidably needs to include the retransmitted packets. QUIC supports multiplexing multiple streams for multiple objects within the same connection. FIG. 2B-1 shows a graph 2021 of audio and video packet sizes on a QUIC connection; the aggregate downlink traffic on the single QUIC connection is shown in the upper timeline in FIG. 2B-1, and the streams for video and audio segments are shown separately in the bottom two timelines in FIG. 2B-1. QUIC thus multiplexes traffic for different segments, making it difficult to separate the different streams from the combined traffic and obtain individual $V_i$ for each segment. In contrast, with HTTPS, $V_i$ typically can be inferred by analyzing the downlink traffic volume between successive requests for each connection.

Segment Sequences

As described below, a Segment Sequence Inferencer (S2I), in accordance with embodiments of the disclosure, can infer detailed downloaded segment identities from encrypted traffic, which enables deep analysis on the player adaptation behavior. S2I is suitable for different platforms including web-based streaming and native apps under various network conditions. In these embodiments, only information generally available in the encrypted network traffic is used (such as packet sizes which are independent of the platforms), together with characteristics of video streaming, e.g. Property (1).

With traffic encryption, only limited information including packet timestamps and sizes are available. Assuming that traffic can be separated for each segment, a methodology can be developed to infer the downloaded segment identities if: (1) the traffic encryption does not obfuscate the segment size information, so that approximate segment sizes $S_i$ can be obtained from the traffic volume $V_i$, and (2) the segment sizes have enough variance so that their identities ($M_i$, $T_i$, $I_i$) can be identified based on the segment sizes.

For efficiency reasons, the TLS protocol does not typically apply extensive traffic padding to hide traffic volume information. FIG. 2B-2 shows a graph 2022 of a traffic/payload size ratio for various payload sizes. We have found that compared with the payload size, HTTPS adds less than 1.5% of overhead, while QUIC usually introduces 5% to 15% traffic overhead (FIG. 2B-2). This higher overhead is due to the fact that QUIC retransmissions cannot be distinguished. The effect of protocol overhead may be expressed as:

$$1 \leq V_i/S_i \leq 1+\alpha \qquad \text{(Property 2)}$$

where a represents the protocol overhead including additional headers etc. In this embodiment, a is selected to be 1.5% for HTTPS and 15% for QUIC. This property tells how to estimate the segment size $S_i$ based on the traffic volume $V_i$, in order to identify the segments.

VBR encoding is increasingly popular, resulting in size variance even for segments in the same track. As an example, video segment sizes are plotted across different tracks of a popular YouTube video in the graph 2031 of FIG. 2C-1. The segment sizes show significant variance, especially for the higher quality tracks. The $95^{th}$ percentile segment size is 2.6 times the average segment size in that track.

A segment sequence is defined as a series of segments $(C_i)^n_{i=1}$ where the indexes of the segments grow contiguously (that is, $I_{i+1}=I_i+1$) and the segments can be from different tracks. Two segment sequences $(C_{1i})^n_{i=1}$, $(C_{2i})^n_{i=1}$ are considered to be similar if every pair of segments $C_{1i}$ and $C_{2i}$ at the same position in their respective sequences have sizes that differ by no more than 10%; that is, $0.9 S_{1i} < S_{2i} < 1.1 S_{1i}$ or $0.9 S_{2i} < S_{1i} < 1.1 S_{2i}$. When two sequences are similar, they can potentially match with the same network traffic volume sequence and are therefore assumed to be indistinguishable based on their size information. A segment sequence is defined to be unique if there is no other segment sequence similar to it.

Considering first segment sequences of length 1 (that is, individual segments), we have found that even with VBR encoding, multiple different segments from both the same track and different tracks can have similar sizes. For each segment in the video in FIG. 2C-1, on average there are 66 other similar segments from either the same or a different track. This makes it challenging to identify a unique segment only based on its size, even for VBR encoded video.

Figures 1, 2C:
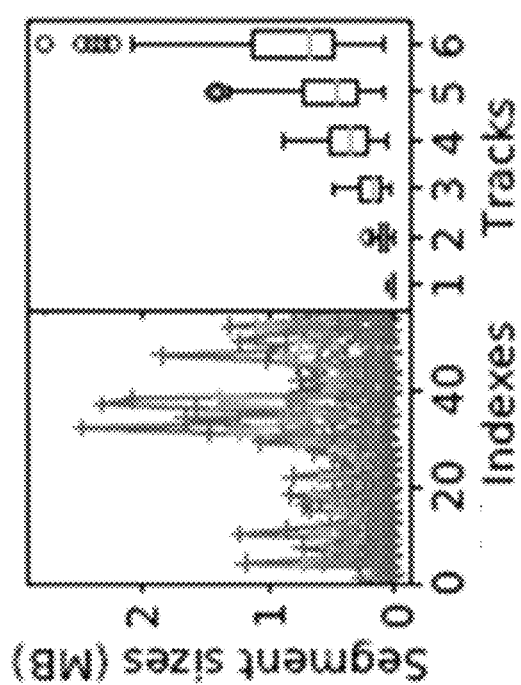
Figures 2, 2C:
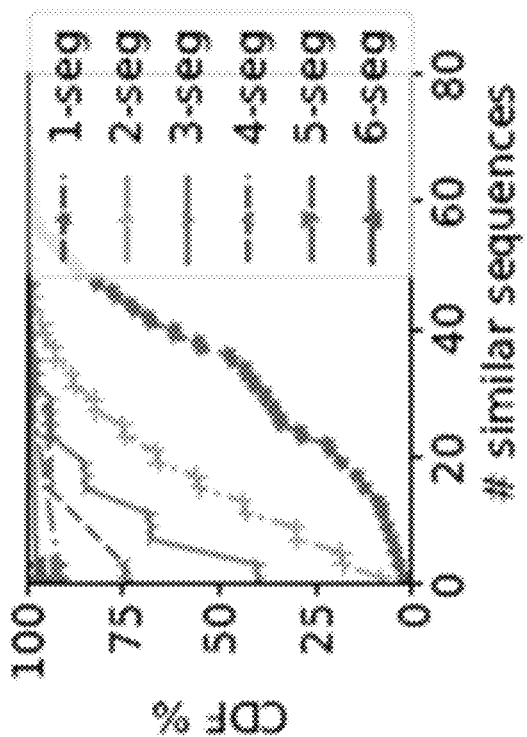

Compared with individual segments, segment sequences with two or more segments are more likely to be unique. An evaluation of uniqueness of segment sequences for a popular YouTube video is shown in FIG. 2C-1. Assuming the video has 6 tracks and each track has 60 segments, in total there are approximately 2000 segment sequences consisting of two segments. (Each sequence is uniquely determined by the index of the first segment and the tracks of all segments in the sequence. Thus the total number of sequences is $59 \times 6^2 = 2124$.) As shown in the graph 2032 of FIG. 2C-2, 7% of segment sequences of size 2 are unique in size and do not have any similar sequences. Compared with this, only 0.7% of individual segments are unique in size. We have found that when the segment length increases, even though the number of sequences increases, a greater percentage of sequences have unique sizes. Out of the approximately 12,000 3-segment sequences, 39% have unique sizes. Out of the approximately 25 million 6-segment sequences, 96% have unique sizes. Thus there is a 96% probability of uniquely identifying the index and track of each segment in the sequence.

Figures 1, 2D:
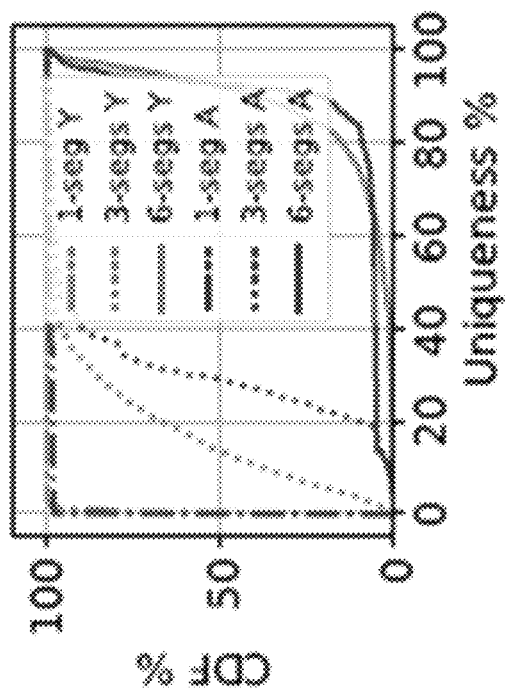
Figures 2, 2D:
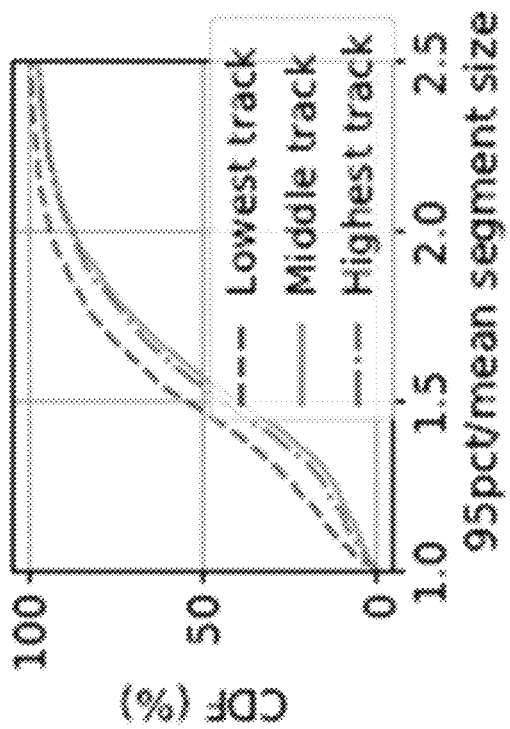

FIG. 2D-1 shows a graph 2041 of size variability of segments in a video using VBR encoding. There is significant size variability across segments in the same track. For the lowest track, 80% of videos encode the content with the $95^{th}$ percentile of segment sizes being more than 1.2 times the average size. The uniqueness of a video for a given sequence length may be understood as the percentage of sequences of that length that are unique. As shown in the graph 2042 of FIG. 2D-2, the uniqueness increases when the sequence has more segments. For 80% of the videos (YouTube and Amazon® videos indicated by Y and A respectively), more than 83% of 6-segment sequences are unique. For 90% of the videos, more than 96% of 6-segment sequences are unique in size.

The above analysis suggests that given even a relatively short sequence of segment sizes, with high probability a unique segment sequence can be found that matches the traffic. This in turn suggests that downloaded segment identities can be inferred from the encrypted traffic.

Segment Sequence Inferencer (S2I)

ABR streaming services may be categorized depending on three factors: Combined (C) or Separate(S) audio/video (that is, whether the server encodes the audio and video content as combined tracks, or separately to be downloaded as separate streams by the player); HTTPS (H) or QUIC (Q) encryption protocol; and whether the player uses SR (Y) or not (N). This leads to eight different system types denoted as {S/C} {H/Q} {N/Y}, which cover several popular streaming services.

An S2I procedure in accordance with embodiments of the disclosure includes a two-stage process: (1) From the encrypted traffic, extract the traffic volume $V_i$ for each downloaded segment; (2) Given the size sequence $(V_i)^n_{i=1}$, infer the identities of the corresponding downloaded segments $(C_i)^n_{i=1}$.

Figures 1, 2E:
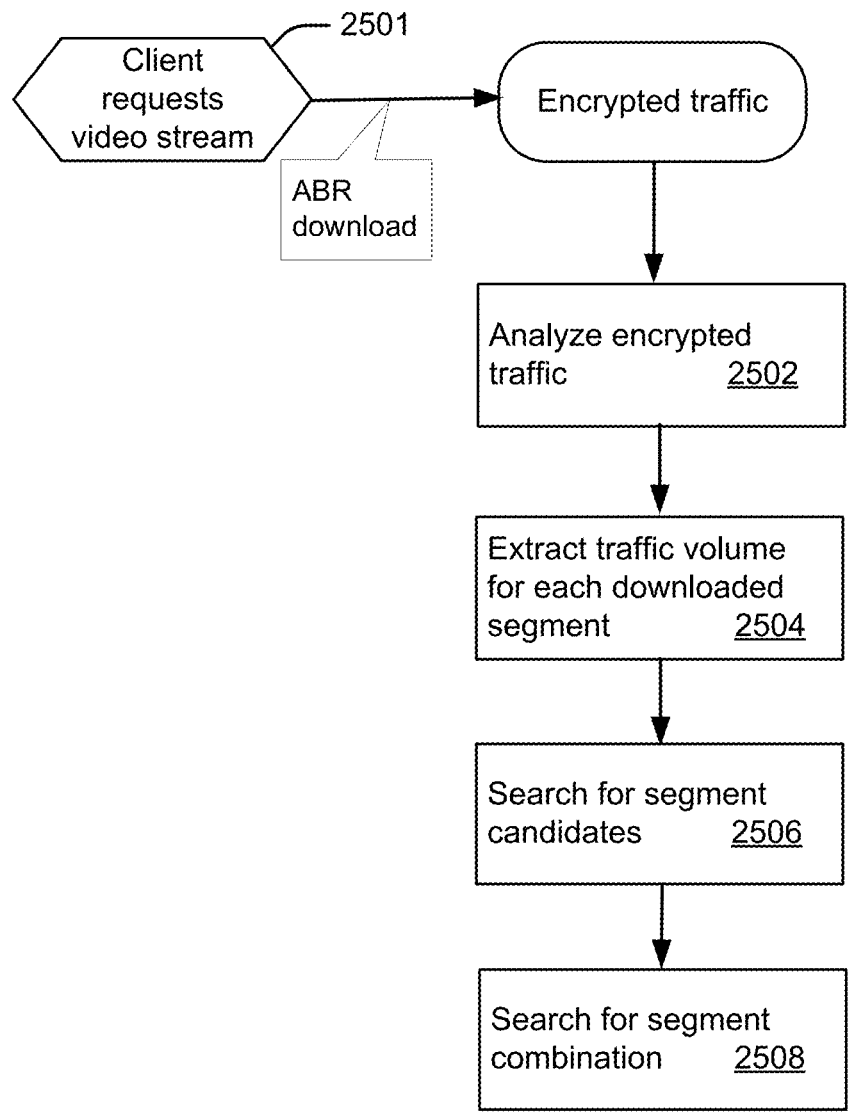
Figures 2, 2E:
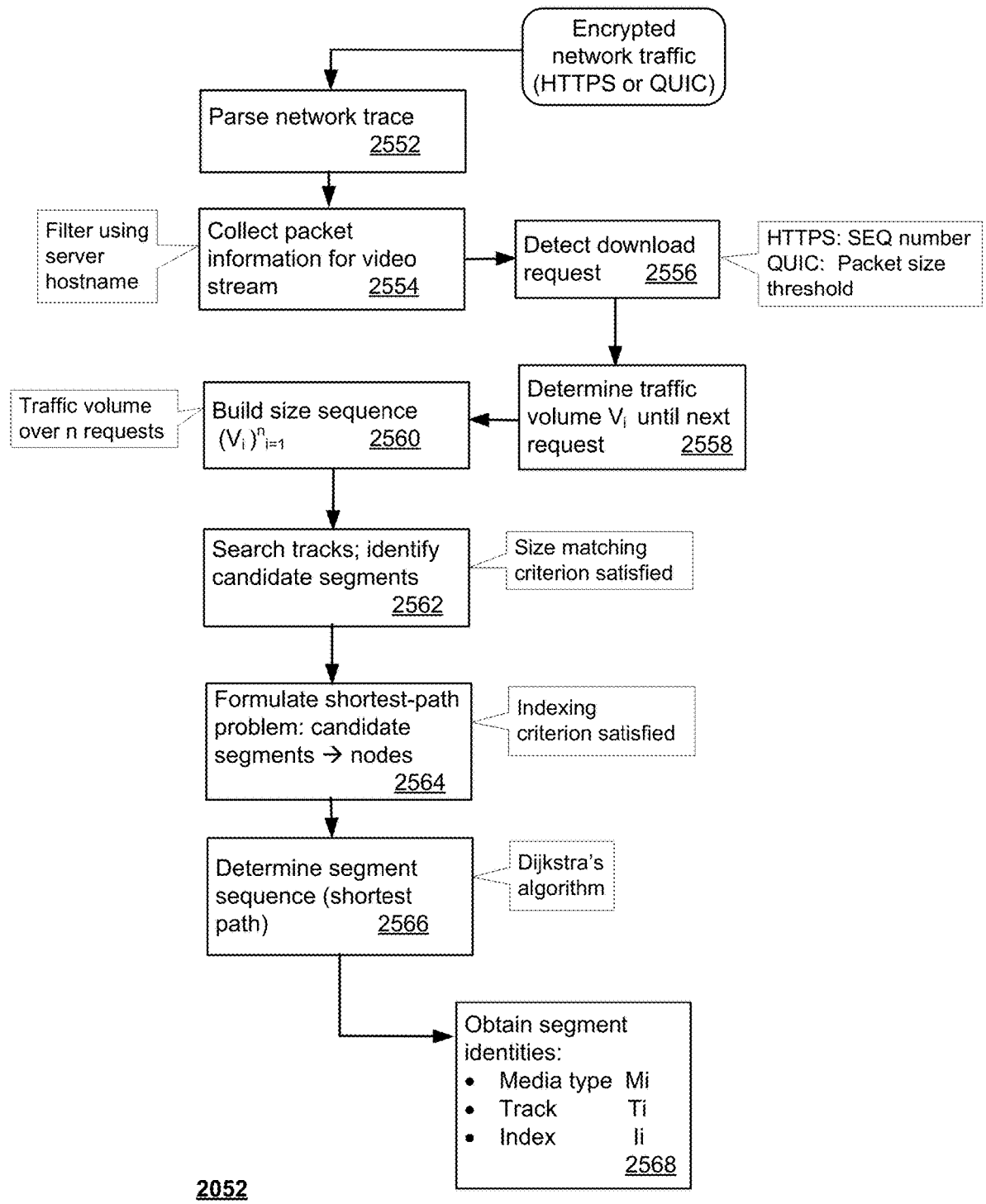

FIG. 2E-1 is a flowchart illustrating a S2I procedure 2051 for the system types noted above, in accordance with embodiments of the disclosure. A client request 2501 for video content causes video traffic to be downloaded from an ABR system; in these embodiments, the traffic is encrypted. As explained above, the traffic may be encrypted according to either a HTTPS or QUIC protocol. A processing system performing the S2I procedure analyzes the encrypted traffic (step 2502) and extracts the traffic volume for each downloaded segment (step 2504). For each segment, the processing system searches across all tracks (step 2506) to identify candidate segments (that is, segments meeting the size criterion of Property 2). The processing system then searches (step 2508) for a combination of candidate segments with indexes meeting the criterion of Property 1.

FIG. 2E-2 is a flowchart illustrating a S2I procedure 2052, in accordance with embodiments of the disclosure, for six of the system types noted above: CHN, CHY, SHN, SHY, CQN and CQY. These system types may be thought of as ABR systems that do not have transport multiplexing.

In step 2552, a processing system performing the S2I procedure parses the network trace, which has network traffic encrypted using the HTTPS or QUIC protocol. In step

2554, the processing system collects the video streaming related packet information. The related connections can be filtered using the server hostname from the SNI during the handshake, e.g. "googlevideo.com" for YouTube.

The processing system then detects the client's download requests (step 2556). For HTTPS, the request packets can be detected using the SEQ number in the uplink TCP packets. For QUIC traffic, the packet size can be used to differentiate the uplink ACK packets and request packets. In this embodiment, ACK packets have sizes smaller than 80 bytes, while the request packets for segments have sizes larger than 600 bytes. Accordingly, in this embodiment packets larger than 300 bytes are treated as the request packets. This size threshold can be configured for different services.

The traffic volume $V_i$ is extracted corresponding to each downloaded segment. Without transport multiplexing, on each connection, the player does not send the next request until the current segment is fully downloaded. Thus the downlink traffic volume can be calculated as $V_i$ between two consecutive requests detected on each connection (step 2558).

Once the size sequence $(V_i)^n_{i=1}$ is determined (step 2560), a search can be made for a segment sequence $(C_i)^n_{i=1}$ that satisfies the size criterion in Property (2) for each i. The search space increases exponentially with the sequence length. In this embodiment, to perform the search efficiently the search is modeled as a shortest-path problem in a graph and then solved using a two-level hierarchy: (1) Search matching segments for each individual request, then (2) combine the segments for different requests into matching contiguous sequences.

For each $V_i$ a search is performed across all tracks to find segments matching size $V_i$ (step 2562). The m segments that match $V_i$ are denoted segment candidates $(C_{i1}, \ldots, C_{im})$. The actual downloaded segment $C_i$ is guaranteed to be one of the candidates, as it also satisfies the size constraints. For the system types with a separate audio track, as all audio segments have the same size $S_a$, we mark $A_i$, i.e. the possibility of $C_i$ to be an audio segment, as true if $V_i$ and $S_a$ satisfies Property (2).

The candidates for each V, are then combined to find the segment sequence with contiguous indexes satisfying Property (1). The search problem becomes selecting a candidate $C_i$ from the set of candidates $\{C_{im}\}$ so that the index of the combined segment sequence $(C_i)^n$ is contiguous. In this embodiment, the search problem is formulated as a shortest-path problem on a graph; each segment candidate then becomes a node in the graph (step 2564).

In step 2566, the shortest path in the graph is determined, thus yielding the segment sequence. The processing system then can obtain the segment identities $M_i, T_i, I_i$ (step 2568).

Figure 2F:
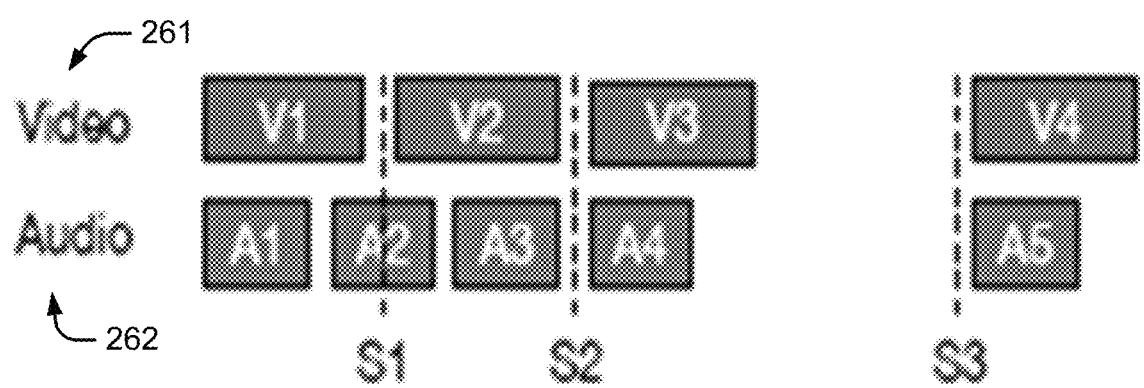
FIG. 2F schematically illustrates splitting audio/video traffic into groups of segments, in accordance with embodiments of the disclosure.
Figures 2, 2G:
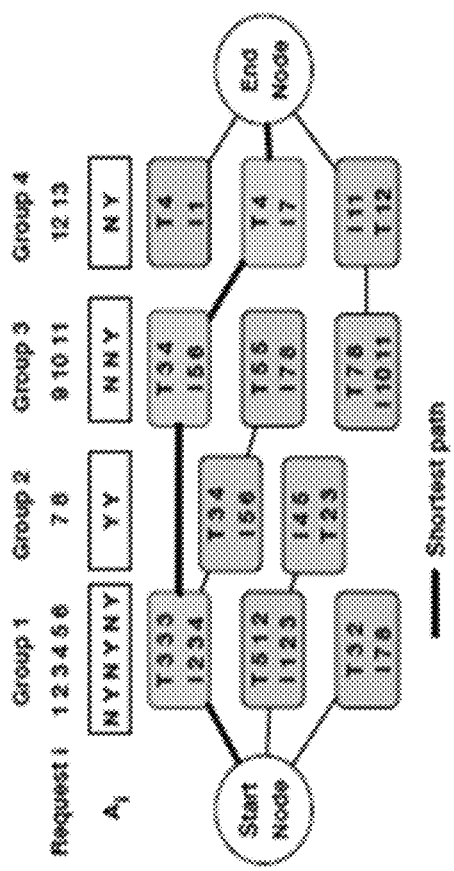
Figures 1, 2G:
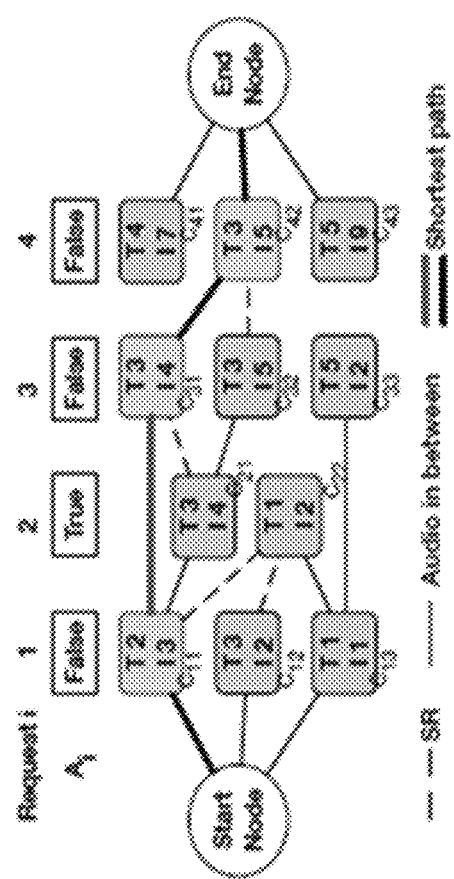

In an embodiment, an edge may be added to the graph between $C_{im}$ and $C_{jn}(j>i)$ if $I_{jn}-I_{im}-1$ and $A_1$ is true for all m<l<n, as shown in illustration 2071 of FIG. 2G-1. This means that these are two consecutive video segments with contiguous indexes. For system types that may perform SR, an edge may be added between the nodes if $I_{jn} \le I_{im}$. In an embodiment, all edge weights are set to 0 and Dijkstra's algorithm is used to find the connected paths covering all requests. Each path is a segment sequence that satisfies both Property (1) and Property (2).

In additional embodiments, since Dijkstra's algorithm finds the paths with the smallest weight, users can assign the edge weight as a penalty to reflect the preferences on the sequences if there are multiple matching sequences. For example, SR occurrence is typically not frequent due to its excessive data usage. To find the sequence with the least SR occurrence, the edge indicating an SR occurrence can be assigned a weight of 1 and the search for the shortest path then performed.

The two remaining system types, SQN and SQY, may be thought of as ABR systems with transport multiplexing. In such systems the client can transfer video and audio segments at the same time on the same QUIC connection. As illustrated earlier in FIG. 2B-1, traffic for different segments cannot be easily distinguished in order to obtain $V_i$ for individual segments. Instead, only the total number of segments n is known from the request number and total traffic volume $\Sigma_{i=1}^n V_i$. Compared with the individual volume information for each segment for system types without transport multiplexing, this aggregated volume constraint requires performing search on the sequence as a whole and increases the search complexity. It also leads to a larger set of possible segment sequences that match with the total volume.

In an embodiment, to reduce complexity due to the aggregated traffic volume constraint, the traffic may be split into smaller groups and the problem solved as a two-level hierarchy, similar to the procedure of FIG. 2E-2. Each group includes the traffic for a smaller set of complete segments. In the example shown in graph 206 of FIG. 2F, instead of searching 9 segments matching total traffic volume, the traffic may be split at times S2 and S3, resulting in 3 groups containing 5, 2 and 2 segments each of video 261 and audio 262. Then in the segment candidate search (step 2506 in FIG. 2E-1), for each group searches are performed for contiguous segment sequence candidates separately given the segment count and total traffic volume constraints. The segment combination search (step 2508 in FIG. 2E-1) is formulated as a shortest path problem in which sequence candidates from different groups are combined into a complete sequence with contiguous segment index matching the whole traffic. The illustration 2072 of FIG. 2G-2 shows an example. Compared with the system types without transport multiplexing, the only difference is that each node is a segment sequence candidate for a traffic group, instead of a segment candidate for a request.

In this embodiment, the split points for the groups also must be chosen. It is desirable to make each group as small as possible in order to reduce the search complexity. In a case where each group only contains one segment, the procedure becomes equivalent to the procedure for the system types without transport multiplexing. In this embodiment, the split points are chosen to ensure that all the traffic for the same segment are in the same group. For example, S1 in FIG. 2F cannot be used as a split point, as otherwise segment A2 is split into two groups.

As illustrated in FIG. 2B-1, in the case of QUIC traffic with multiplexing the time when a download starts can be observed based on the request packets, but not when the response ends. In this embodiment, a new request indicates that a previous segment has finished downloading, but it cannot be determined which was the corresponding request for that segment, as there could be multiple ongoing downloads. In an embodiment, this problem can be addressed using properties of video streaming and introducing two types of split point for QUIC traffic.

The first type of split point SP1 is based on the ON-OFF traffic pattern that is widely observed in popular players. Due to buffer management, the client typically pauses fetching segments for a period if the video buffer occupancy is higher than some threshold, resulting in a periodic ON-OFF pattern in the traffic. Thus the traffic may be split when the OFF period is observed. S3 in FIG. 2F is such a split point.

In the implementation, the OFF period can be detected using an idle period longer than some threshold. This threshold typically can be set as a few seconds and can also be configured for each service.

The second type of split point SP2 is based on the practice that with QUIC, players only download at most 1 video and 1 audio segment concurrently. Thus the traffic may be split when the player sends out two requests at the same time, as this indicates all previous downloads are finished. S2 in FIG. 2F is such a split point.

We have found that a split point such as SP1 can effectively reduce the group size in steady phase with periodical OFF periods. A split point such as SP2 can effectively reduce the group size when the player keeps fetching segments. Players generally ensure some synchronizations in sending out audio and video requests, as both contents are necessary for smooth playback. As audio segments are typically much smaller and the downloads finish much earlier than video segments, the player eventually needs to wait until the video segment download finishes and then send out the next video and audio segment requests at the same time, creating a SP2 instance. Combining these two types of split points the traffic can be effectively split into smaller groups.

In SQY systems SR may occur, so that a later download could correspond to a segment with a smaller index than earlier downloaded segments. As a result, the search space of potential segment sequences is greatly increased. For example, for a video with 5 tracks and 100 segments per track, the number of all 4-segment sequences with SR is $10^5$ times larger than the number of 4-segment sequences without SR.

In accordance with embodiments of the disclosure, to assist the analysis for the SQY systems, some additional information can be utilized, namely the identities of segments displayed on the screen. This can reduce the search space substantially. It should be noted that even when the displayed segments are known, it still is desirable to infer other information to understand client behavior. This information can include the time when each displayed segment was downloaded, whether it was an SR replacement, and if so, what was the track and download time of the corresponding earlier downloaded segment with the same index which was discarded due to SR and not displayed on the screen.

In a further embodiment, it is assumed that during SR only video segments are replaced while audio segments are not. Therefore, if a response size V, matches with the size of a displayed video segment $S_j$, that indicates that this video segment could potentially be an SR replacement for an earlier downloaded segment with the same index. In this embodiment, it may also be assumed that each index is only replaced once. As SR consumes extra network bandwidth, SR logic typically attempts to avoid performing SR on the same index multiple times. This implies that all replacement video segments are finally displayed on the screen. These two assumptions may be used to identify the potential replacement segments, particularly for the SQY system type.

After identifying potential replacement segments, the two-level hierarchical approach may be used, similar to the SQN system type, to identify whether these segments are actually replacement segments. First, a search is performed for segment sequence candidates for other groups that do not include replacement segments; a shortest path problem is then formulated to find the complete segment sequence. In this embodiment, the tracks of the segments that are displayed from the screen are already known; the searched sequence thus should match with such information.

Figure 2H:
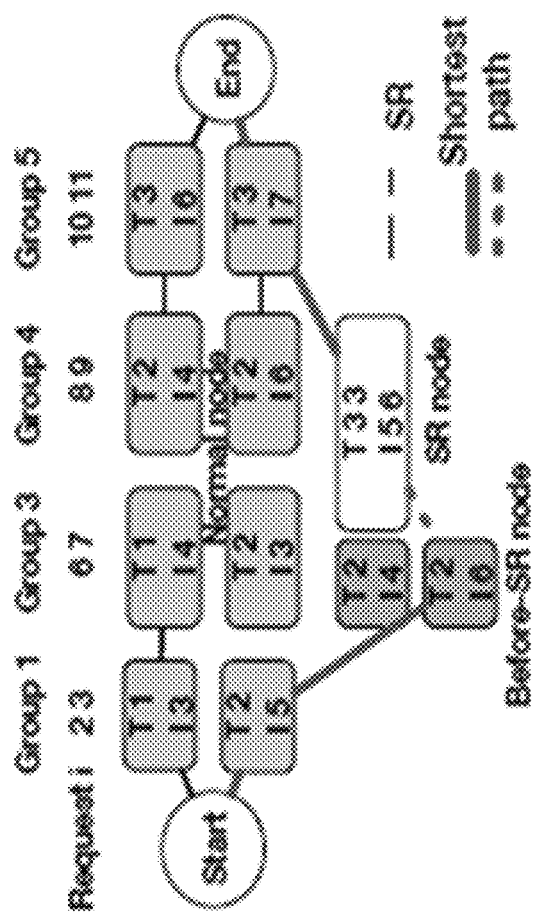
FIG. 2H schematically illustrates a graph used to solve a shortest-path problem in S2I inferencing when the video includes segment replacement (SR), in accordance with embodiments of the disclosure.

As shown in illustration 208 of FIG. 2H, a graph in the case of an SQY system can have multiple types of nodes. The first type, the normal nodes, are the candidates mapping to the displayed segments without SR. A second type, SR nodes, correspond to a potential replacement sequence. These SR nodes do not include audio segments, and each one video segment in the node matches with the size of a response. A third type of nodes, the before-SR nodes, correspond to the discarded video segments. The indexes of segments in the before-SR nodes must be among the indexes in the SR node. Segments in the normal node and SR node are displayed on the screen and thus their tracks need to follow the displayed tracks. Segments in the before-SR node can be from any track.

In this embodiment, edges may be added in the graph between the normal nodes in the same way as the SQN system type. If SR actually does not occur, a path can then be found covering all requests using just normal nodes. When SR occurs, the path will go from the normal node to the before-SR nodes, then to the SR node, and finally back to the normal node. For such a path, edges can accordingly be added between normal nodes and before-SR nodes, between before-SR nodes and SR nodes, and between SR nodes and normal nodes. In this embodiment, Dijkstra's algorithm may be used to find the shortest path.

While for purposes of simplicity of explanation, the respective processes are shown and described as a series of blocks in FIGS. 2E-1 and 2E2, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of communication network 100, the subsystems and functions of system 2011, and methods 2051, 2052 presented in FIGS. 1, 2A-1, 2E-1, 2E-2, and 3. For example, virtualized communication network 300 can facilitate in whole or in part detecting a plurality of request packets corresponding to a sequence of requests by a network client for video segments to be downloaded at the network client, and determining a traffic volume downloaded at the network client between consecutive requests, thereby obtaining a sequence of traffic volumes.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc.

For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
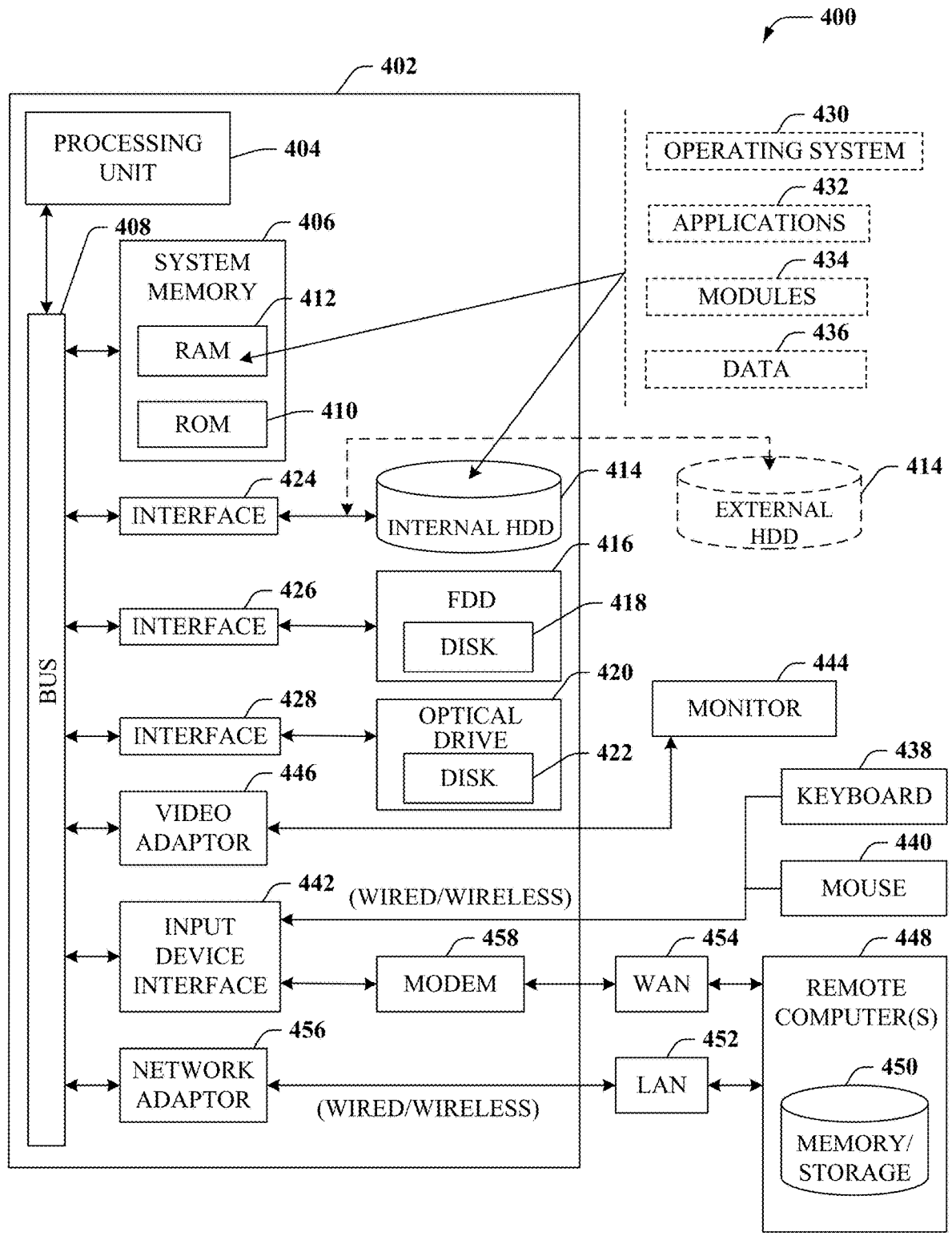
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part detecting a plurality of request packets corresponding to a sequence of requests by a network client for video segments to be downloaded at the network client; determining a traffic volume downloaded at the network client between consecutive requests to obtain a sequence of traffic volumes; identifying, from the plurality of tracks for each respective one of the sequence of traffic volumes, a set of candidate segments each having a size meeting a size-matching criterion relative to the respective one of the sequence of traffic volumes; and selecting a segment from the set of candidate segments for each respective one of the sequence of traffic volumes, to determine a segment sequence meeting an index-matching criterion relative to the sequence of traffic volumes.

Generally, program modules comprise routines, programs, components, data structures, etc., that perform particular tasks or implement particular abstract data types. Moreover, those skilled in the art will appreciate that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network.

In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
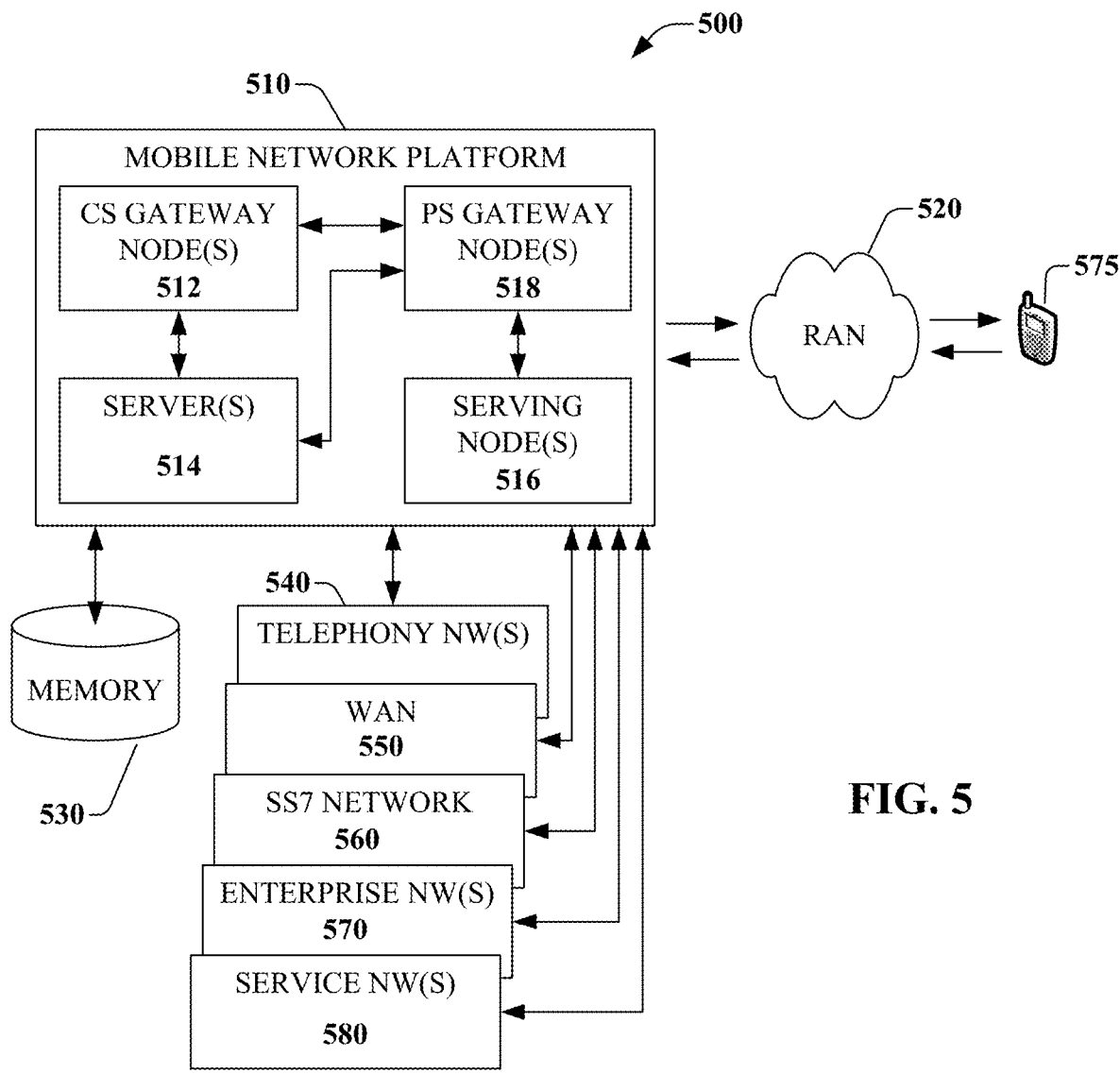
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate, in whole or in part, parsing a network trace to collect packet information for a video stream; detecting a plurality of request packets corresponding to a sequence of requests by a network client for video segments to be downloaded at the network client; determining a traffic volume downloaded at the network client between consecutive requests, thereby obtaining a sequence of traffic volumes; and identifying, from the plurality of tracks for each respective one of the sequence of traffic volumes, a set of candidate segments each having a size meeting a size-matching criterion relative to the respective one of the sequence of traffic volumes.

In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
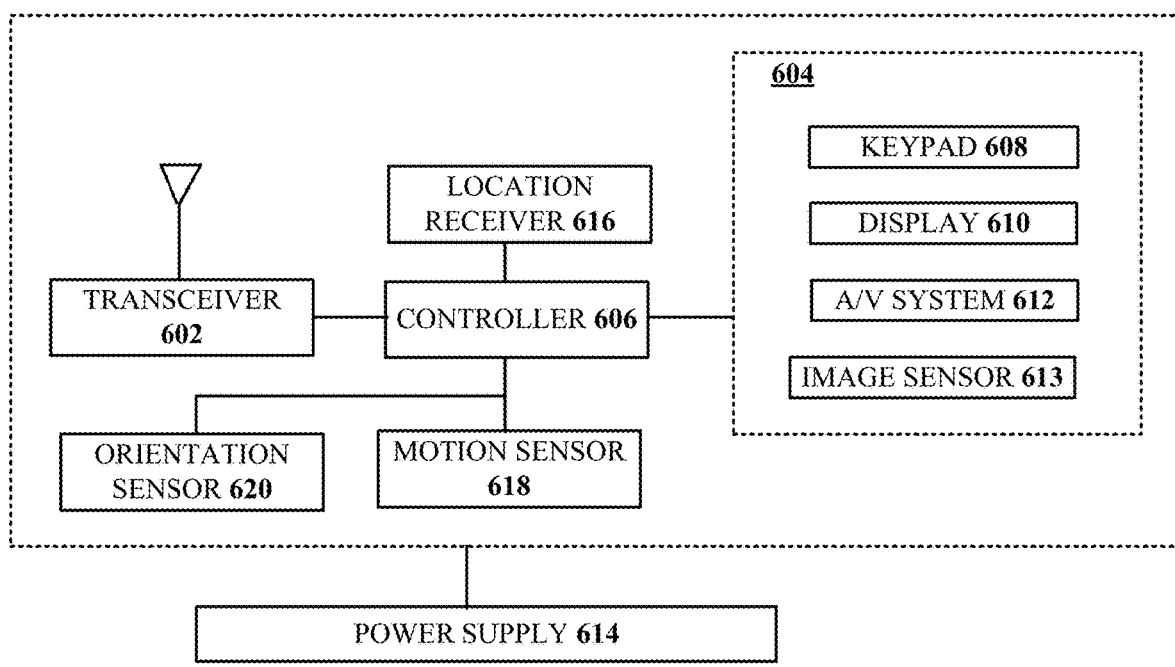
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part a network client requesting an encrypted video stream, where the video stream comprises an adaptive bit rate (ABR) stream encoded into a plurality of tracks having different bitrates, and where a processing system determines a traffic volume downloaded at the network client between consecutive requests to obtain a sequence of traffic volumes, and infers characteristics of the sequence of traffic volumes based on a segment sequence of the traffic.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SL-DRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x1, x2, x3, x4, \ldots, xn)$, to a confidence that the input belongs to a class, that is, $f(x)$ =confidence(class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A method, comprising:

detecting, by a processing system including a processor in communication with a network, requests from a network client for media content;

determining, by the processing system, a sequence of traffic volumes to form a size sequence, wherein the sequence of traffic volumes comprises a plurality of traffic volumes downloaded at the network client in response to the requests, wherein each of the plurality of traffic volumes is downloaded between consecutive requests, wherein the plurality of traffic volumes are downloaded from an adaptive bit rate (ABR) media content stream distributed via the network, the ABR media content stream comprising a plurality of tracks;

identifying, by the processing system, for each respective one of the sequence of traffic volumes, a set of candidate segments of the media content stream, each of the set of candidate segments having associated therewith an overhead and having a size meeting a size-matching criterion based on a size of the overhead relative to a size of the respective one of the sequence of traffic volumes;

selecting, by the processing system, a segment from the set of candidate segments for each respective one of the sequence of traffic volumes, thereby determining a segment sequence meeting an index-matching criterion relative to the sequence of traffic volumes; and inferring, by the processing system, characteristics of the sequence of traffic volumes based on the segment sequence.

2. The method of claim 1, wherein the selecting comprises formulating a shortest-path problem for a graph, in which the sets of candidate segments correspond to nodes of the graph.

3. The method of claim 1, wherein the media content stream is encrypted according to one of a secure hypertext transfer protocol (HTTPS) or a Quick User Datagram Protocol Internet Connections (QUIC) protocol.

4. The method of claim 1, wherein the ABR media content stream comprises an audio track and a plurality of video tracks.

5. The method of claim 4, wherein the audio track is separate from the video tracks and comprises a plurality of audio segments having a constant size.

6. The method of claim 1, further comprising detecting, by the processing system, a plurality of request packets corresponding to a sequence of requests by the network client for video segments to be downloaded at the network client, wherein the request packets are detected in accordance with a packet size threshold.

7. The method of claim 1, wherein the inferred characteristics comprise a media type, a track, a segment index, a segment size, or any combination thereof.

8. The method of claim 1, wherein the index-matching criterion is based at least in part on a media type of the respective one of the sequence of traffic volumes.

9. The method of claim 1, wherein the size of the overhead is determined at least in part by an encryption protocol.

10. The method of claim 1, wherein in accordance with the index-matching criterion, the segment sequence comprises segments with contiguous indexes.

11. A device, comprising:
a processing system including a processor; and
a memory that stores executable instructions that, when executed by the processing system, facilitate performance of operations, the operations comprising:
detecting requests for media content from a network client communicating over a network;
determining a sequence of traffic volumes to form a size sequence, wherein the sequence of traffic volumes comprises a plurality of traffic volumes downloaded at the network client in response to the requests, wherein each of the plurality of traffic volumes is downloaded between consecutive requests, wherein the plurality of traffic volumes are downloaded from an adaptive bit rate (ABR) media content stream distributed via the network, the ABR media content stream comprising audio content, video content or a combination thereof, the ABR media content stream comprising a plurality of tracks;
identifying, for each respective one of the sequence of traffic volumes, a set of candidate segments of the media content stream, each of the set of candidate segments having an overhead associated therewith and having a size meeting a size-matching criterion based on a size of the overhead relative to a size of the respective one of the sequence of traffic volumes;
selecting, by the processing system, a segment from the set of candidate segments for each respective one of the sequence of traffic volumes, thereby determining a segment sequence meeting an index-matching criterion relative to the sequence of traffic volumes; and inferring, by the processing system, characteristics of the sequence of traffic volumes based on the segment sequence.

12. The device of claim 11, wherein the selecting comprises formulating a shortest-path problem for a graph, in which the sets of candidate segments correspond to nodes of the graph.

13. The device of claim 11, wherein the index-matching criterion is based at least in part on a media type of the respective one of the sequence of traffic volumes.

14. The device of claim 11, wherein the size of the overhead is determined at least in part by an encryption protocol used to encrypt the media content stream.

15. The device of claim 14, wherein the encryption protocol comprises one of a secure hypertext transfer protocol (HTTPS) or a Quick User Datagram Protocol Internet Connections (QUIC) protocol.

16. A non-transitory machine-readable medium comprising executable instructions that, when executed by a processing system including a processor, facilitate performance of operations, the operations comprising:
detecting requests for content from a network client in communication with a network;
determining a sequence of traffic volumes to form a size sequence, wherein the sequence of traffic volumes comprises a plurality of traffic volumes downloaded at the network client in response to the requests, wherein each of the plurality of traffic volumes is downloaded between consecutive requests, wherein the plurality of traffic volumes are downloaded from an adaptive bit rate (ABR) content stream distributed via the network, the ABR content stream comprising a plurality of tracks;
identifying, for each respective one of the sequence of traffic volumes, a set of candidate segments of the content stream, each of the set of candidate segments having an overhead associated therewith and having a size meeting a size-matching criterion based on a size of the overhead relative to a size of the respective one of the sequence of traffic volumes;
selecting a segment from the set of candidate segments for each respective one of the sequence of traffic volumes, thereby determining a segment sequence meeting an index-matching criterion relative to the sequence of traffic volumes; and
inferring characteristics of the sequence of traffic volumes based on the segment sequence.

17. The non-transitory machine-readable medium of claim 16, wherein the selecting comprises formulating a shortest-path problem for a graph, in which the sets of candidate segments correspond to nodes of the graph.

18. The non-transitory machine-readable medium of claim 16, wherein the ABR content stream comprises an audio track and a plurality of video tracks.

19. The non-transitory machine-readable medium of claim 16, wherein the ABR content stream is encrypted using a secure hypertext transfer protocol (HTTPS) encryption protocol or a Quick User Datagram Protocol Internet Connections (QUIC) encryption protocol.

20. The non-transitory machine-readable medium of claim 19, wherein the size of the overhead is determined at least in part by the encryption protocol.

* * * * *